US008907018B2

(12) United States Patent
Bellehumeur et al.

(10) Patent No.: US 8,907,018 B2
(45) Date of Patent: Dec. 9, 2014

(54) ROTOMOLDING RESIN

(71) Applicants: Celine Bellehumeur, Calgary (CA); Yves Lacombe, Calgary (CA); Mark Hoidas, Calgary (CA)

(72) Inventors: Celine Bellehumeur, Calgary (CA); Yves Lacombe, Calgary (CA); Mark Hoidas, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 4 days.

(21) Appl. No.: 13/890,292

(22) Filed: May 9, 2013

(65) Prior Publication Data
US 2013/0310532 A1 Nov. 21, 2013

(30) Foreign Application Priority Data

May 17, 2012 (CA) ...................................... 2777386

(51) Int. Cl.
C08F 210/16 (2006.01)
C08F 297/08 (2006.01)
B29C 41/04 (2006.01)
B29C 41/00 (2006.01)

(52) U.S. Cl.
CPC ............... C08F 210/16 (2013.01); B29C 41/04 (2013.01); B29C 41/003 (2013.01)
USPC ............... 525/240; 525/53; 525/191; 526/65; 526/348.2; 264/503

(58) Field of Classification Search
USPC ................... 525/53, 191, 240; 526/65, 348.2; 264/503
See application file for complete search history.

(56) References Cited

U.S. PATENT DOCUMENTS

| 5,132,380 | A | 7/1992 | Stevens et al. |
| 5,198,401 | A | 3/1993 | Turner et al. |
| 5,292,845 | A | 3/1994 | Kawasaki et al. |
| 5,382,630 | A | 1/1995 | Stehling et al. |
| 5,382,631 | A | 1/1995 | Stehling et al. |
| 6,969,741 | B2 | 11/2005 | Lustiger et al. |
| 7,230,054 | B2 | 6/2007 | Mavridis et al. |
| 8,022,143 | B2 | 9/2011 | Wang |
| 8,067,518 | B2 | 11/2011 | Davey et al. |
| 2006/0241256 | A1* | 10/2006 | Baann et al. ................... 526/170 |
| 2008/0221273 | A1* | 9/2008 | Michie, Jr. et al. ........... 525/240 |
| 2012/0214954 | A1* | 8/2012 | Buck et al. ..................... 526/113 |

FOREIGN PATENT DOCUMENTS

WO 2005/121239 A2 12/2005
WO 2011/025742 A1 3/2011

OTHER PUBLICATIONS

Randall, James C., "A Review of High Resolution Liquid 13Carbon Nuclear Magnetic Resonance Characterizations of Ethylene-Based Polymers", JMS-Rev. Macromol. Chem. Phys., C29(2 & 3) pp. 201-317 (1989).
ASTM D6645-01; Standard Test Method for Methyl (Comonomer) Content in Polyethylene by Infrared Spectrophotometry, Jan. 2010.
ASTM D1238-10; Standard Test Method for Melt Flow Rates of Thermoplastics by Extrusion Plastometer, Mar. 2010.
ASTM D1693-12; Standard Test Method for Environmental Stress-Cracking of Ethylene Plastics, May 2012.
ASTM D790-10; Standard Test Methods for Flexural Properties of Unreinforced and Reinforced Plastics and Electrical Insulating Materials, Apr. 2010.
ASTM D638-10; Standard Test Method for Tensile Properties of Plastics, Jun. 2010.
ASTM D5628-10; Standard Test Method for Impact Resistance of Flat, Rigid Plastic Speciments by Means of a Falling Dart (Tup or Falling Mass), Jul. 2010.

* cited by examiner

Primary Examiner — Roberto Rabago
(74) Attorney, Agent, or Firm — Lawrence T. Kale

(57) ABSTRACT

Resins suitable for rotomolded articles comprise a bimodal polyethylene copolymer comprising from 0.1 to 5 weight % of one or more $C_{6-8}$ alpha olefins and the balance ethylene, comprising from 20 to 50 weight % of a higher molecular weight polymer component having an Mw greater than 120,000 and correspondingly from 80 to 50 weight % of a lower molecular weight polymer component having an Mw less than 100,000 having a density greater than 0.942 g/cc [but less than 0.965 g/cc] and a bent strip ESCR as determined by ASTM D 1693 in 100% Igepal® CO-630 (ethoxylated nonylphenols) for conditions A and B of greater than 1000 hours. The resulting articles have a very good balance of properties and significant ESCR.

11 Claims, 2 Drawing Sheets

Deconvolution (Branch Frequency Distribution) Example 1

ROTOMOLDING RESIN

FIELD OF THE INVENTION

The present invention relates to polymers for use in rotomolding articles. The polymers have exceptional environmental stress crack resistance and are useful in a number of applications including larger parts.

BACKGROUND OF THE INVENTION

There are a number of different considerations for manufacturing a resin suitable for use in rotomolding manufacture. The resin needs to be: capable of production at commercially acceptable rates of production; suitable for use in the rotomolding process (e.g., for example, having a suitable sintering temperature and a suitable cooling rate to be removed from the mold) and finally must have suitable properties for the end use application. One important property that is sought is environmental stress cracking. The resin should not develop cracks due to exposure to chemicals, sunlight, etc. in applications such as tank sprayers for agricultural use, cisterns, and smaller rotomolded parts.

U.S. Pat. Nos. 5,382,630, and 5,382,631, issued Jan. 17, 1995 to Stehling, assigned to Exxon, teach bimodal resins having superior physical properties. The patent requires that the blend have a two or more components, each having a polydispersity (Mw/Mn) of less than 3 and the blend having a polydispersity greater than 3 and no component in the blend having a relatively higher molecular weight and a lower comonomer content (e.g., the comonomer incorporation is reverse). The reference does not suggest improved ESCR.

U.S. Pat. No. 6,969,741, issued Nov. 29, 2005 to Lustiger et al., assigned to ExxonMobil, teaches a blend of polyethylenes suitable for rotomolding. The patent teaches the difference in the density of each component is not less than 0.030 g/cc. The difference in the densities of the component polymers in the present composition is less than 0.030 g/cc.

U.S. Pat. No. 7,230,054, issued Jun. 12, 2007 to Mavridis et al., assigned to Equistar, teaches a blend of a low density relatively higher molecular weight component and a high density relatively lower molecular weight component. The resin blends appear to be made in a slurry process suing Ziegler Natta catalysts or modified Ziegler Natta catalysts. The blends of the present invention are made using a solution polymerization process and a catalyst containing a phosphinimine ligand.

WO 2011/025742A1, published Mar. 3, 2011 in the name of Davis, assigned to Dow Global Technologies Inc., teaches a polymer blend having a high ESCR. The blend has a residual unsaturation of less than 0.06 per 1000 carbon atoms. The blends of the present invention have a residual unsaturation of greater than 0.06 per 1000 carbon atoms.

U.S. Pat. No. 8,067,518 B2, published Nov. 29, 2011 in the names of Davey et al., assigned to Univation, teaches a polymer made in gas phase using a very specific catalyst has enhanced ESCR properties and proccessability. The polymers produced in accordance with the disclosure do not appear to be bimodal.

The present invention seeks to provide a novel bimodal polymer having excellent ESCR.

SUMMARY OF THE INVENTION

The present invention provides a bimodal polyethylene copolymer comprising from 0.1 to 5 weight % of one or more $C_{6-8}$ alpha olefins and the balance ethylene, comprising from 20 to 50 weight % of a higher molecular weight polymer component having an Mw greater than 120,000 and correspondingly from 80 to 50 weight % of a lower molecular weight polymer component having an Mw less than 100,000 having a density greater than 0.942 g/cc, preferably but less than 0.965 g/cc, and a bent strip ESCR conditions A and B greater than 1000 hours, as determined by ASTM D 1693 in 100% Igepal CO-630.

In a further embodiment, the present invention provides a polyethylene copolymer wherein the higher molecular weight component has an Mw from 140,000 to 300,000.

In a further embodiment, the present invention provides a polyethylene copolymer wherein the lower molecular weight component has an Mw from 20,000 to 80,000.

In a further embodiment, the present invention provides a polyethylene copolymer wherein the higher molecular weight component is present in an amount from 30 to 40 weight % based on the weight of the copolymer.

In a further embodiment, the present invention provides a polyethylene copolymer wherein the higher molecular weight component has a density from 0.918 g/cc to 0.934 g/cc.

In a further embodiment, the present invention provides a polyethylene copolymer wherein the lower molecular weight component has a density from 0.942 to 0.960 g/cc.

In a further embodiment, the present invention provides a polyethylene copolymer wherein the density difference between the higher molecular weight component and the lower molecular weight component is less than 0.030 g/cc.

In a further embodiment, the present invention provides a polyethylene copolymer having a Mz/Mw from 2.4 to 3.2.

In a further embodiment, the present invention provides a polyethylene copolymer having a density greater than 0.940, preferably greater than 0.942 g/cc.

In a further embodiment, the present invention provides a polyethylene copolymer having a flat to reverse comonomer incorporation.

In a further embodiment, the present invention provides a polyethylene copolymer having a degree of internal unsaturation from 0.1 to 0.5 per 1000 carbon atoms.

In a further embodiment, the present invention provides a rotomolded article comprising the above resin.

In a further embodiment, the present invention provides a process for rotomolding comprising: placing sufficient compounded resin as described above into the molds; and heating and rotating the molds in a controlled temperature environment above the melting temperature of the compounded resin until the resin has melted and integrally uniformly coated the internal surface of the mold; cooling the mold to cause the resin to solidify; and removing the article from the mold.

Compounding agents/additives may be used as needed. Typical additives include one or more of antioxidants, antistatic agents, UV stabilizers, foaming agent, processing aids, nucleating agents, nano-composites, fiber reinforcements, and pigments.

DETAILED DESCRIPTION OF THE INVENTION

Figure 1:
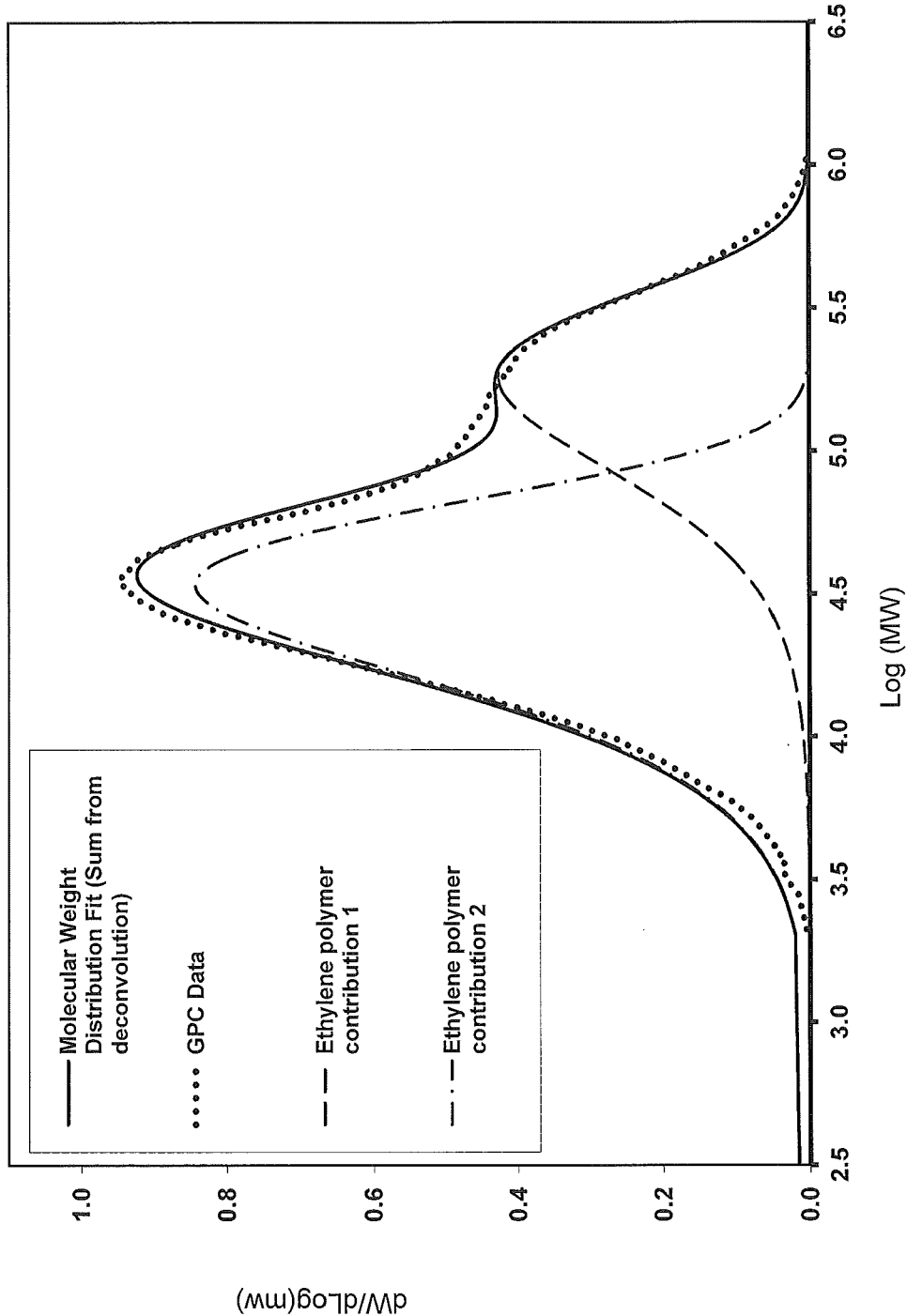
FIG. 1 is a plot of the molecular weight distribution obtained by GPC of the polymer of Example 1 and the computer model predictions of the molecular weight distributions of the first and second ethylene polymers that are comprised in the polymer of Example 1.
Figure 2:
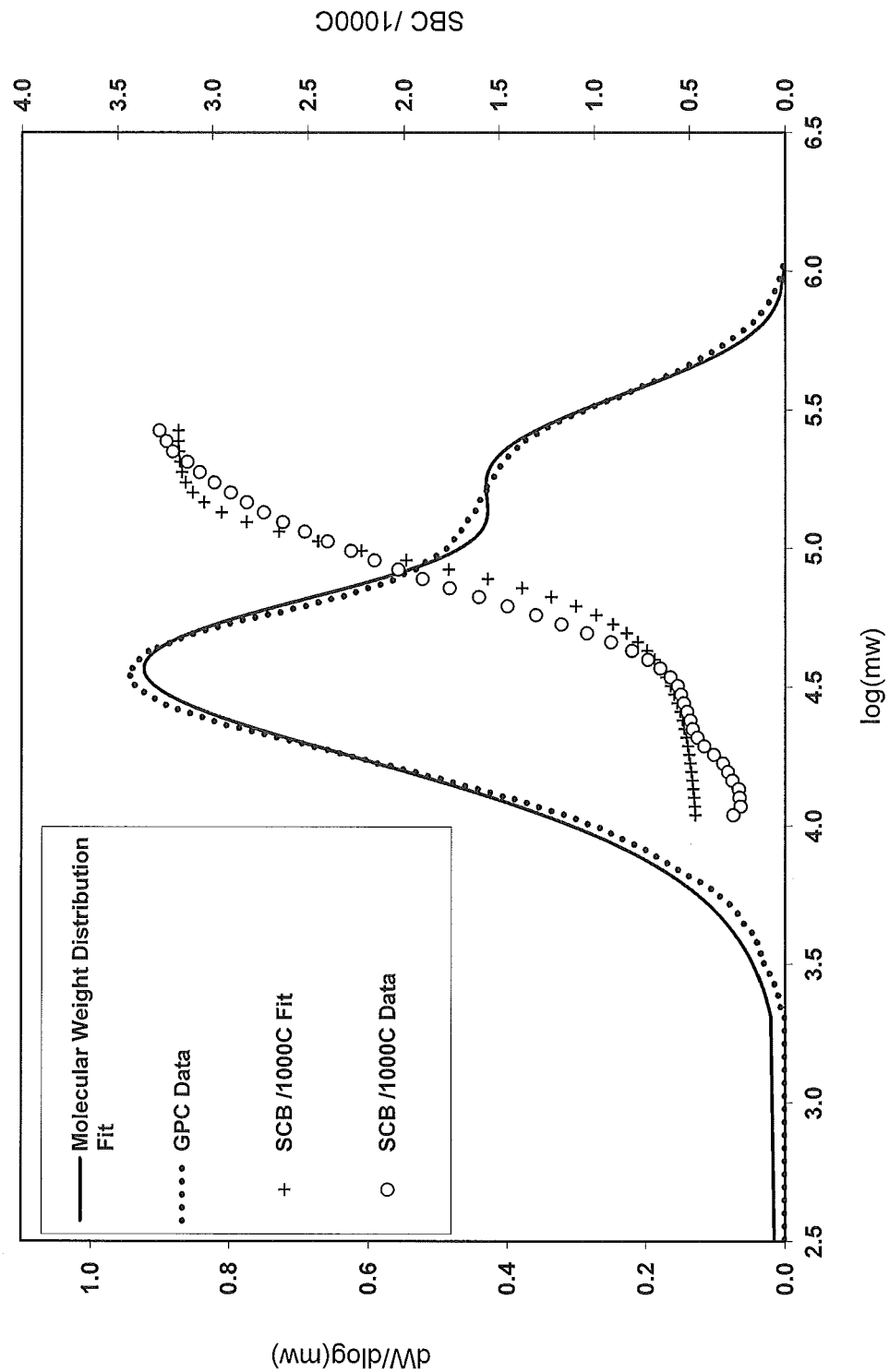
FIG. 2 is a plot of the molecular weight distribution obtained by GPC of the polymer of Example 1 and the computer model of the polymer molecular weight distribution as well as the short chain branching distribution (model prediction and that determined from GPC-FTIR).

The polymers of the present invention are bimodal polyethylene having two distinct components. Typically, this is demonstrated by the presence of a "shoulder" at the right side of a GPC curve indicating (generally, a smaller amount) of a higher molecular weight component. In the present invention, the higher molecular weight is present in an amount from 20 to 50, weight % of the entire composition, preferably from 30 to 40 weight %, based on the weight of the entire composition. The lower molecular weight component is present in corresponding amounts from 80 to 50 weight %, of the entire composition, preferably from 70 to 60 weight %, based on the weight of the entire composition.

The polymer comprises from 0.1 to 5, typically from 1.0 to 3.0, preferably from 1.5 to 2.5 weight % of one or more $C_{6-8}$ alpha olefins and the balance ethylene. Preferably, the comonomer is 1-octene but it could also be 1-hexene.

The higher molecular weight component has a weight average molecular weight (Mw) greater than 120,000, typically from 140,000 to 300,000, preferably from 160,000 to 240,000 as determined using gel permeation chromatography (GPC). The higher molecular weight component has a lower density than the lower molecular weight component. The density of the higher molecular weight component in the polymer may range from 0.918 g/cc to 0.934 g/cc. typically from about 0.920 to 0.932 g/cc, preferably from 0.922 to 0.930 g/cc. The density of the component (or the total polymer) is a function of the degree of comonomer incorporation. The higher molecular weight component has a degree of short chain branching per 1000 carbon atoms from 1.5 to 5, typically from 1.8 to 5, preferably from 1.8 to 4.

The lower molecular weight component has a weight average molecular weight (Mw) less than 100,000, typically from 20,000 to 80,000, preferably from 25,000 to 50,000 as determined using gel permeation chromatography (GPC). The lower molecular weight component has a higher density than the higher molecular weight component. The density of the lower molecular weight component in the polymer is greater than 0.942 g/cc, typically from 0.945 to 0.960, most preferably from 0.950 to 0.958 g/cc. The difference in density between the relatively high molecular weight component and the relatively low molecular weight component is less than 0.030 g/cc, typically from 0.025 to 0.029 g/cc.

The lower molecular weight (higher density component) has a degree of short chain branching of less than 1 per 1000 carbon atoms, typically from 0.5 to 0.95, preferably from 0.5 to 0.9 short chain branches per 1000 carbon atoms. The polymers of the present invention do not have detectable long chain branching. Accordingly, even though it is not possible to differentiate long chain branches from short chain branches that have 6 carbon atoms, given the absence of long chain branching the detected or calculated branching is ascribed to short chain branching.

The overall properties of the polyethylene include the following:

density from 0.940 to 0.947, preferably from 0.942 to 0.946 g/cc;

melt index under a load of 2.16 kg ($I_2$) at a temperature of 190° C. as determined by ASTM 1238 from 1.25 to 2.5, preferably from 1.5 to 2.0 g/10 minutes;

a melt index under a load of 21.6 kg ($I_{21}$) at a temperature of 190° C. as determined by ASTM 1238 from 30 to 80, preferably from 50 to 80 g/10 minutes;

a melt flow ratio ($I_{21}/I_2$) from 20 to 60, preferably from 30 to 50;

a zero shear viscosity at 190° from 5,000 to 10,000 Pa-s, preferably from 6,000 to 8,000 Pa-s; and a G' at G"=500 MPa from 30 to 200 MPa, preferably from 30 to 80 MPa.

a tensile elongation at yield from 8 to 12%, preferably from 9 to 12%;

a tensile yield strength from 20 to 26 MPa, preferably from 22 to 24 MPa;

an ultimate tensile elongation from 750 to 1000%, preferably from 800 to 1000%;

an ultimate tensile strength from 28 to 43 MPa, preferably form 30 to 40 MPa;

a Sec. Mod. 1% from 1000 to 1200 MPa preferably from 1000 to 1180 MPa;

a flex Sec. Mod from 925 to 1020 MPa, preferably from 950 to 1000 MPa;

a flex Tan Mod from 1000 to 1350 MPa, preferably from 1100 to 1300 MPa;

a flexural strength from 25 to 35 MPa, preferably from 29 to 33 MPa;

a primary melting peak as determined by differential scanning calorimetry from 126 to 129° C.;

a heat of fusion as determined by differential scanning calorimetry from 175 to 195 J/g, preferably from 180 to 192 J/g;

an ESCR ($f_{50}$) at condition A 100% Igepal CO-630 (ethoxylated nonylphenols) greater than 1000 hours; and an ESCR ($f_{50}$) at condition B 100% Igepal CO-630 greater than 1000 hours.

The overall polymer incorporates the following architecture.

Branch frequency/1000 carbon atoms by FTIR between 2.2 and 3, preferably between 2.4 and 3;

Comonomer content by FTIR from 1 to 3 wt %, preferably from 1.5 to 2.5 wt %;

Internal unsaturation/1000 carbon atoms by FTIR from 0.10 to 0.50, preferably from 0.10 to 0.15;

Side chain unsaturation/1000 carbon atoms by FTIR <0.1;

Terminal unsaturation/1000 carbon atoms by FTIR from 0.05 to 0.12, preferably from 0.07 to 0.12;

Number average molecular weight (Mn) by GPC from 24,000 to 33,000, preferably from 25,000 to 30,000;

Weight average molecular weight (Mw) by GPC from 85,000 to 100,000, preferably from 87,000 to 90,000;

The Z average molecular weight (Mz) by GPC from 220,000 to 232,000, preferably from 225,000 to 230,000;

a polydispersity (Mn/Mw) from 2.75 to 4.0, preferably from 2.9 to 3.4;

an index (Mz/Mw) from 2.4 to 3.2, preferably from 2.5 to 2.8;

a $CDBI_{25}$ (Composition Distribution Branch Index the weight % of polymer molecules having a commoner content within 25% of the median total comonomer content of the polymer) of greater than 65%, typically from 65 to 85%;

a $CDBI_{50}$ (Composition Distribution Branch Index the weight % of polymer molecules having a commoner content within 50% of the median total comonomer content of the polymer) greater than 80%, typically from 85 to 92%;

The polymer may be made using a solution polymerization technique. In the solution polymerization of ethylene with one or more comonomers, typically $C_{3-8}$, preferably $C_{4-8}$ alpha olefins, the monomers are typically dissolved in an inert hydrocarbon solvent, typically a $C_{5-12}$ hydrocarbon, which may be unsubstituted or substituted by a $C_{1-4}$ alkyl group, such as pentane, methyl pentane, hexane, heptane, octane, cyclohexane, methylcyclohexane and hydrogenated naphtha.

An example of a suitable solvent that is commercially available is "Isopar E" ($C_{8-12}$ aliphatic solvent, Exxon Chemical Co.).

Catalyst and activators are also dissolved in the solvent or suspended in a diluent miscible with the solvent at reaction conditions.

The Catalyst

The catalyst is a compound of the formula:

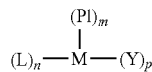

wherein M is selected from the group consisting of Ti, Zr and Hf; Pl is a phosphinimine ligand of the formula:

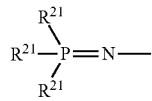

wherein each $R^{21}$ is independently selected from the group consisting of a hydrogen atom; a halogen atom; hydrocarbyl radicals, typically $C_{1-10}$, which are unsubstituted by or further substituted by a halogen atom; $C_{1-8}$ alkoxy radicals; $C_{6-10}$ aryl or aryloxy radicals; amido radicals; silyl radicals of the formula:

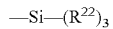

wherein each $R^{22}$ is independently selected from the group consisting of hydrogen, a $C_{1-8}$ alkyl or alkoxy radical and $C_{6-10}$ aryl or aryloxy radicals; and a germanyl radical of the formula:

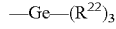

wherein $R^{22}$ is as defined above;

L is a monoanionic cyclopentadienyl-type ligand independently selected from the group consisting of cyclopentadienyl-type ligands, Y is independently selected from the group consisting of activatable ligands; m is 1 or 2; n is 0 or 1; p is an integer and the sum of m+n+p equals the valence state of M.

The preferred phosphinimines are those in which each $R^{21}$ is a hydrocarbyl radical, preferably a $C_{1-6}$ hydrocarbyl radical, most preferably a $C_{1-4}$ hydrocarbyl radical.

The term "cyclopentadienyl" refers to a 5-member carbon ring having delocalized bonding within the ring and typically being bound to the active catalyst site, generally a group 4 metal (M) through $\eta^5$-bonds. The cyclopentadienyl ligand may be unsubstituted or up to fully substituted with one or more substituents selected from the group consisting of $C_{1-10}$ hydrocarbyl radicals which are unsubstituted or further substituted by one or more substituents selected from the group consisting of a halogen atom and a $C_{1-4}$ alkyl radical; a halogen atom; a $C_{1-8}$ alkoxy radical; a $C_{6-10}$ aryl radical, an aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—(R)$_3$ wherein each R is independently selected from the group consisting of hydrogen, a $C_{1-8}$ alkyl or alkoxy radical, $C_{6-10}$ aryl or aryloxy radicals; and germanyl radicals of the formula Ge—(R)$_3$ wherein R is as defined above.

Preferably, the cyclopentadienyl-type ligand is selected from the group consisting of a cyclopentadienyl radical, an indenyl radical and a fluorenyl radical which radicals are unsubstituted or up to fully substituted by one or more substituents selected from the group consisting of a fluorine atom, a chlorine atom; $C_{1-4}$ alkyl radicals; and a phenyl or benzyl radical which is unsubstituted or substituted by one or more fluorine atoms.

Activatable ligands Y may be selected from the group consisting of a halogen atom, $C_{1-4}$ alkyl radicals, $C_{6-20}$ aryl radicals, $C_{7-12}$ arylalkyl radicals, $C_{6-10}$ phenoxy radicals, amido radicals which may be substituted by up to two $C_{1-4}$ alkyl radicals and $C_{1-4}$ alkoxy radicals. Preferably, Y is selected from the group consisting of a chlorine atom, a methyl radical, an ethyl radical and a benzyl radical.

Suitable phosphinimine catalysts are Group 4 organometallic complexes which contain one phosphinimine ligand (as described above) and one cyclopentadienyl-type (L) ligand and two activatable ligands.

Activators:

The activators for the catalyst are typically selected from the group consisting of aluminoxanes and ionic activators.

Alumoxanes:

Suitable alumoxane may be of the formula: $(R^4)_2AlO(R^4AlO)_mAl(R^4)_2$ wherein each $R^4$ is independently selected from the group consisting of $C_{1-20}$ hydrocarbyl radicals and m is from 0 to 50, preferably $R^4$ is a $C_{1-4}$ alkyl radical and m is from 5 to 30. Methylalumoxane (or "MAO") in which each R is methyl is the preferred alumoxane.

Alumoxanes are well known as cocatalysts, particularly for metallocene-type catalysts. Alumoxanes are also readily available articles of commerce.

The use of an alumoxane cocatalyst generally requires a molar ratio of aluminum to the transition metal in the catalyst from 20:1 to 1000:1. Preferred ratios are from 50:1 to 250:1.

Commercially available MAO typically contains free aluminum alkyl (e.g., trimethylaluminum or "TMA") which may reduce catalyst activity and/or broaden the molecular weight distribution of the polymer. If a narrow molecular weight distribution polymer is required, it is preferred to treat such commercially available MAO with an additive which is capable of reacting with the TMA. Alcohols are preferred (with hindered phenols being particularly preferred) for this purpose.

"Ionic Activators" Cocatalysts:

So-called "ionic activators" are also well known for metallocene catalysts. See, for example, U.S. Pat. No. 5,198,401 (Hlatky and Turner) and U.S. Pat. No. 5,132,380 (Stevens and Neithamer).

Whilst not wishing to be bound by any theory, it is thought by those skilled in the art that "ionic activators" initially cause the abstraction of one or more of the activatable ligands in a manner which ionizes the catalyst into a cation, then provides a bulky, labile, non-coordinating anion which stabilizes the catalyst in a cationic form. The bulky, non-coordinating anion permits olefin polymerization to proceed at the cationic catalyst center (presumably because the non-coordinating anion is sufficiently labile to be displaced by monomer which coordinates to the catalyst. Preferred ionic activators are boron-containing ionic activators described in (i) (iii) below:

(i) compounds of the formula $[R^5]^+[B(R^7)_4]^-$ wherein B is a boron atom, $R^5$ is an aromatic hydrocarbyl (e.g., triphenyl methyl cation) and each $R^7$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^9)_3$; wherein each $R^9$ is independently selected from the group consisting of a hydrogen atom and a $C_{1-4}$ alkyl radical; and (ii) compounds of the formula $[(R^8)_tZH]^+[B(R^7)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with the nitrogen atom may form an anilinium radical and $R^7$ is as defined above; and (iii) compounds of the formula $B(R^7)_3$ wherein $R^7$ is as defined above.

In the above compounds, preferably $R^7$ is a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

The "ionic activator" may abstract one or more activatable ligands so as to ionize the catalyst center into a cation but not to covalently bond with the catalyst and to provide sufficient distance between the catalyst and the ionizing activator to permit a polymerizable olefin to enter the resulting active site.

Examples of ionic activators include: triethylammonium tetra(phenyl)boron; tripropylammonium tetra(phenyl)boron; tri(n-butyl)ammonium tetra(phenyl)boron; trimethylammonium tetra(p-tolyl)boron; trimethylammonium tetra(o-tolyl) boron; tributylammonium tetra(pentafluorophenyl)boron; tripropylammonium tetra(o,p-dimethylphenyl)boron; tributylammonium tetra(m,m-dimethylphenyl)boron; tributylammonium tetra(p-trifluoromethylphenyl)boron; tributylammonium tetra(pentafluorophenyl)boron; tri(n-butyl) ammonium tetra(o-tolyl)boron; N,N-dimethylanilinium tetra (phenyl)boron; N,N-diethylanilinium tetra(phenyl)boron; N,N-diethylanilinium tetra(phenyl)n-butylboron, N,N-2,4,6-pentamethylanilinium tetra(phenyl)boron; di-(isopropyl)ammonium tetra(pentafluorophenyl)boron; dicyclohexylammonium tetra(phenyl)boron, triphenylphosphonium tetra (phenyl)boron; tri(methylphenyl)phosphonium tetra(phenyl) boron; tri(dimethylphenyl)phosphonium tetra(phenyl)boron; tropillium tetrakispentafluorophenyl borate; triphenylmethylium tetrakispentafluorophenyl borate; benzene(diazonium) tetrakispentafluorophenyl borate; tropillium phenyltrispentafluorophenyl borate; triphenylmethylium phenyltrispentafluorophenyl borate; benzene(diazonium) phenyltrispentafluorophenyl borate; tropillium tetrakis(2,3,5, 6-tetrafluorophenyl)borate; triphenylmethylium tetrakis(2,3, 5,6-tetrafluorophenyl)borate; benzene(diazonium)tetrakis(3, 4,5-trifluorophenyl)borate; tropillium tetrakis(3,4,5-trifluorophenyl)borate; benzene(diazonium)tetrakis(3,4,5-trifluorophenyl)borate; tropillium tetrakis(1,2,2-trifluoroethenyl)borate; triphenylmethylium tetrakis(1,2,2-trifluoroethenyl)borate; benzene(diazonium)tetrakis(1,2,2-trifluoroethenyl)borate; tropillium tetrakis(2,3,4,5-tetrafluorophenyl) borate; triphenylmethylium tetrakis(2,3,4, 5-tetrafluorophenyl)borate; and benzene(diazonium)tetrakis (2,3,4,5-tetrafluorophenyl)borate.

Readily commercially available ionic activators include: N,N-dimethylaniliniumtetrakispentafluorophenyl borate; triphenylmethylium tetrakispentafluorophenyl borate; and trispentafluorophenyl borane.

The ionic activator may be used at about molar equivalents of boron to group IV metal in the catalyst. Suitable molar ratios of group IV metal from the catalyst to boron may range from 1:1 to 3:1, preferably from 1:1 to 1:2.

In some instances, the ionic activator may be used in combination with an alkylating activator (which may also serve as a scavenger). The ionic activator may be selected from the group consisting of $(R^3)_pMgX_{2-p}$ wherein X is a halide and each $R^3$ is independently selected from the group consisting of $C_{1-10}$ alkyl radicals and p is 1 or 2; $R^3Li$ wherein in $R^3$ is as defined above, $(R^3)_qZnX_{2-q}$ wherein $R^3$ is as defined above, X is halogen and q is 1 or 2; $(R^3)_sAlX_{3-s}$ wherein $R^3$ is as defined above, X is halogen and s is an integer from 1 to 3. Preferably in the above compounds $R^3$ is a $C_{1-4}$ alkyl radical, and X is chlorine. Commercially available compounds include triethyl aluminum (TEAL), diethyl aluminum chloride (DEAC), dibutyl magnesium ($(Bu)_2Mg$), and butyl ethyl magnesium (BuEtMg or BuMgEt).

If the phosphinimine catalyst is activated with a combination of ionic activators (e.g., boron compounds) and alkylating agent the molar ratio of group IV metal from the catalyst: metalloid (boron) from the ionic activator:metal from the alkylating agent may range from 1:1:1 to 1:3:10, preferably from 1:1.3:5 to 1:1.5:3.

Polymerization Process

The temperature of the reactor(s) in a high temperature solution process is from about 80° C. to about 300° C., preferably from about 120° C. to 250° C. The upper temperature limit will be influenced by considerations that are well known to those skilled in the art, such as a desire to maximize operating temperature (so as to reduce solution viscosity), while still maintaining good polymer properties (as increased polymerization temperatures generally reduce the molecular weight of the polymer). In general, the upper polymerization temperature will preferably be between 200 and 300° C. The most preferred reaction process is a "medium pressure process", meaning that the pressure in the reactor(s) is preferably less than about 6,000 psi (about 42,000 kiloPascals or kPa). Preferred pressures are from 10,000 to 40,000 kPa (1450-5800 psi), most preferably from about 14,000-22,000 kPa (2,000 psi to 3,000 psi).

In some reaction schemes, the pressure in the reactor system should be high enough to maintain the polymerization solution as a single phase solution and to provide the necessary upstream pressure to feed the polymer solution from the reactor system through a heat exchanger system and to a devolatilization system. Other systems permit the solvent to separate into a polymer rich and polymer lean stream to facilitate polymer separation.

The solution polymerization process may be conducted in a stirred "reactor system" comprising one or more stirred tank reactors or in one or more loop reactors or in a mixed loop and stirred tank reactor system. The reactors may be in tandem or parallel operation. In a dual tandem reactor system, the first polymerization reactor preferably operates at lower temperature. The residence time in each reactor will depend on the design and the capacity of the reactor. Generally, the reactors should be operated under conditions to achieve a thorough mixing of the reactants. In addition, it is preferred that from 20 to 60 wt % of the final polymer is polymerized in the first reactor, with the balance being polymerized in the second reactor.

A particularly useful solution polymerization process uses at least two polymerization reactors.

The polymerization temperature in the first reactor is from about 80° C. to about 180° C. (preferably from about 120° C. to 160° C.) and the second reactor is preferably operated at a higher temperature (up to about 220° C.). The most preferred reaction process is a "medium pressure process", meaning that the pressure in each reactor is preferably less than about 6,000 psi (about 42,000 kilopascals or kPa), most preferably from about 2,000 psi to 3,000 psi (about 14,000 22,000 kPa).

The following examples are intended to aid in understanding the present invention, however, in no way, should these examples be interpreted as limiting the scope thereof.

EXAMPLES

Test Methods

Mn, Mw and Mz (g/mol) were determined by high temperature Gel Permeation Chromatography (GPC) with differential refractive index detection using universal calibration (e.g., ASTM-D646-99). The molecular weight distribution (MWD) is the ratio of the weight average molecular weight (Mw) over the number average molecular weight (Mn).

GPC-FTIR was used to determine the comonomer content as a function of molecular weight. After separation of the polymer by GPC an on-line FTIR measures the concentration of the polymer and methyl end groups. Methyl end groups are used in the branch frequency calculations. Conventional calibration allows for the calculation of a molecular weight distribution.

Mathematical deconvolutions were performed to determine the relative amount of polymer, molecular weight, and comonomer content of the component made in each reactor, by assuming that each polymer component follows a Flory molecular weight distribution function and it has a homogeneous comonomer distribution across the whole molecular weight range. The uniform comonomer distribution of each resin component, which is the result from the use of a single site catalyst, allowed the estimation of the short chain branching content (SCB), in branches per 1000 carbon atoms for the first and second ethylene polymers, based on the deconvoluted relative amounts of first and second ethylene polymer components in the polyethylene composition, and their estimated resin molecular weight parameters from the above procedure.

The short chain branch frequency (SCB per 1000 carbon atoms) of copolymer samples was determined by Fourier Transform Infrared Spectroscopy (FTIR) as per ASTM D6645-01. A Thermo-Nicolet 750 Magna-IR Spectrophotometer was used for the measurement. FTIR was also used to determine internal, side chain and terminal levels of unsaturation.

Comonomer content can also be measured using $^{13}$C NMR techniques as discussed in Randall Rev. Macromol. Chem. Phys., C29 (2&3), p. 285; U.S. Pat. No. 5,292,845 and WO 2005/121239.

Polyethylene composition density (g/cm$^3$) was measured according to ASTM D792.

Melt indexes $I_2$, $I_5$ and $I_{21}$ for the polyethylene composition were measured according to ASTM D1238.

The density and melt index of the first and second ethylene polymers that comprise the polyethylene composition were determined based on composition models. The following equations were used to calculate the density and melt index I2 (REFERENCE U.S. Pat. No. 8,022,143 B2, by Wang, assigned to NOVA Chemicals and published Sep. 20, 2011):

$$\text{Density} = 0.979863 - 5.95808 \times 10^{-3} \left(\frac{SCB}{1000C}\right)^{0.65} - 3.8133 \times 10^{-4} [\log_{10}(M_n)]^3 - 5.77986 \times 10^{-6} (M_w/M_n)^3 + 5.57395 \times 10^{-3} (M_z/M_w)^{0.25}$$

$$\log_{10}(\text{Melt Index } I_2) = 22.326528 + 3.467 \times 10^{-3} [\log_{10}(M_n)]^3 - 4.322582 [\log_{10}(M_w)] - 1.80061 \times 10^{-1} [\log_{10}(M_z)]^2 + 2.6478 \times 10^{-2} [\log_{10}(M_z)]^3$$

where Mn, Mw, Mz, and SCB/1000C are the deconvoluted values of the individual ethylene polymer components, as obtained from the results of the deconvolution described above.

Primary melting peak (° C.), heat of fusion (J/g) and crystallinity (%) were determined using differential scanning calorimetry (DSC) as follows: the instrument was first calibrated with indium; after which a polymer specimen is equilibrated at 0° C.; the temperature was increased to 200° C. at a heating rate of 10° C./min; the melt was then kept at that temperature for five minutes; the melt was then cooled to 0° C. at a cooling rate of 10° C./min and kept at 0° C. for five minutes; the specimen was heated a second time to 200° C. at a heating rate of 10° C./min. The melting peak (Tm), heat of fusion and crystallinity reported are calculated based on the second heating cycle.

The rheological properties were evaluated from oscillatory measurements conducted using a Rheometrics RDSII rotational rheometer at 190° C. The zero-shear viscosity was evaluated by fitting the Ellis model to the experimental data.

Plaques molded from the polyethylene compositions were tested according to the following ASTM methods: Bent Strip Environmental Stress Crack Resistance (ESCR), ASTM D1693; Flexural properties, ASTM D 790; Tensile properties, ASTM D 638.

Rotomolded parts were prepared in a rotational molding machine sold under the tradename Rotospeed RS3-160 by Ferry Industries Inc. The machine has two arms which rotate about a central axis within an enclosed oven. The arms are fitted with plates which rotate on an axis that is roughly perpendicular to the axis of rotation of the arm. Each arm is fitted with six cast aluminum molds that produce plastic cubes having dimensions of 12.5 inches (31.8 cm)×12.5 inches×12.5 inches. The arm rotation was set to about 8 revolutions per minute (rpm) and the plate rotation was set to about 2 rpm. These molds produce parts having a nominal thickness of about 0.25 inches (0.64 cm) when initially filled with a standard charge of about 8.2 lb (3.7 kg) of polyethylene resin in powder form (35 US mesh size). The temperature within the enclosed oven was maintained at a temperature of 560° F. (293° C.). The molds and their content were heated for specified period of time. The molds were subsequently cooled in a controlled environment prior to removing the parts. Specimens were collected from the molded parts for density measurements (density as is) and for determining the color rating and whiteness index (color as is). The ARM impact test was performed in accordance with ASTM D5628 at a test temperature of −40° F. (−40° C.).

The Resin

Bimodal polyethylene compositions were prepared at a dual reactor pilot plant. In this dual reactor process, the content of the first reactor flows into the second reactor, both of which are well mixed. The process operates using continuous feed streams. The catalyst (cyclopentadienyl Ti tri tert.butyl phosphimine di chloride) was fed to both reactors. The overall production rate was about 90 kg/hr.

The polymer compositions prepared at the pilot plant were stabilized by a conventional additive package prior to carrying out plaque testing and rotomolding trials.

The polymerization conditions are provided in Table 1. The resulting polyethylene compositions are described in Table 2. The properties of the resulting resins are compared to two commercially available rotomolding resins which are referred to as comparative example 2 and 3, respectively. Properties for the first ethylene polymer and the second ethylene polymer were estimated from deconvolution studies carried out on results obtained from GPC and GPC-FTIR. Results are set forth in Table 3. The properties of pressed plaques as well as rotomolded parts made from the polyethylene compositions are provided in Tables 4 and 5.

TABLE 1

|  | Internal Comparison | Example 1 | Example 2 | Example 3 |
|---|---|---|---|---|
| Ethylene split between first reactor (R1) and second reactor (R2) (R1/(R1 + R2) | 0.30 | 0.35 | 0.35 | 0.35 |
| Octene split between first Reactor (R1) and second reactor (R2) | 1 | 1 | 1 | 1 |
| Octene to ethylene ratio in fresh feed | 0.024 | 0.061 | 0.056 | 0.048 |
| Hydrogen in reactor 1 (ppm) | 1.45 | 1 | 1 | 1 |
| Hydrogen in reactor 2 (ppm) | 2.8 | 10 | 6 | 7.5 |
| Reactor 1 temperature (° C.) | 141 | 141 | 142 | 140 |
| Reactor 2 temperature (° C.) | 207 | 210 | 210 | 210 |
| Catalyst feed in reactor 1(ppm) | 0.19 | 0.34 | 0.1 | 0.08 |
| Catalyst feed in reactor 2 (ppm) | 0.24 | 0.24 | 0.42 | 0.41 |

TABLE 2

|  | Internal Comparison | Comparative Example 2 | Comparative Example 3 | Example 1 | Example 2 | Example 3 |
|---|---|---|---|---|---|---|
| Density (g/cm$^3$) | 0.9460 | 0.9435 | 0.9456 | 0.9439 | 0.9442 | 0.9453 |
| Melt Index $I_2$ (g/10 min) | 1.68 | 2.12 | 1.64 | 1.74 | 1.5 | 1.52 |
| Melt Index $I_5$ (g/10 min) |  |  |  |  |  | 4.64 |
| Melt Index $I_{10}$ (g/10 min) |  |  |  |  |  | 13.1 |
| Melt Index $I_{21}$ (g/10 min) | 37.1 | 50.5 | 38.8 | 68.9 | 52 | 54.7 |
| Melt Flow Ratio ($I_{21}/I_2$) | 22.1 | 23.5 | 23.7 | 39.6 | 35 | 35.6 |
| Zero Shear Viscosity - 190° C. (Pa-s) | 6650 |  |  | 6460 | 7924 | 7177 |
| G' at G" = 500 MPa (MPa) | 83 |  |  | 69 | 43 | 168 |
| Branch Freq/1000 C. | 1.2 | 3.4 | 3 | 2.8 | 2.3 | 2.4 |
| Comonomer ID | octene | hexene | hexene | octene | octene | octene |
| Comonomer Content (wt %) | 1 | 2 | 1.8 | 2.2 | 1.8 | 1.9 |
| Internal Unsat/1000 C. | 0.13 | 0 |  | 0.11 | 0.14 | 0.14 |
| Total Unsat/1000 C. | 0.22 | 0.12 |  | 0.19 | 0.31 | 0.26 |
| $M_n$ | 45774 | 33948 | 31747 | 28536 | 26727 | 28699 |
| $M_w$ | 89984 | 94962 | 100283 | 87251 | 90848 | 88479 |
| $M_z$ | 173787 | 311386 | 293678 | 225844 | 230637 | 229456 |
| Polydispersity Index ($M_w/M_n$) | 1.97 | 2.8 | 3.16 | 3.06 | 3.4 | 3.08 |
| Index (Mz/Mw) | 1.9 | 3.3 | 2.9 | 2.6 | 2.5 | 2.6 |
| CDBI-25: | 68.9 |  |  | 67.5 | 80.9 | 80.4 |
| CDBI-50: | 85.5 | 67.7 | 62 | 87.2 | 90.4 | 88.3 |
| Primary Melting Peak (° C.) | 129.4 |  | 130.1 | 127.2 | 127.8 | 128.1 |
| Heat of Fusion (J/g) | 196.3 |  | 181.5 | 190.8 | 188.7 | 187.3 |
| Crystallinity (%) | 67.7 |  | 62.6 | 65.8 | 65.1 | 64.6 |

TABLE 3

|  | Internal Comparison | Example 1 | Example 2 | Example 3 |
|---|---|---|---|---|
| FIRST ETHYLENE POLYMER (Deconvolution Studies) | | | | |
| $M_n$ | 94,209 | 94,588 | 86,063 | 88,916 |
| $M_w$ | 188,417 | 189,177 | 172,125 | 177,832 |
| Weight fraction (%) | 0.20 | 0.33 | 0.31 | 0.33 |
| $M_Z$ | 282,626 | 283,765 | 258,188 | 266,748 |
| Branch Freq/1000C (SCB1) | 0.9 | 3.2 | 1.9 | 2.2 |
| Density estimate (g/cm$^3$) (d1) | 0.9324 | 0.9252 | 0.9300 | 0.9287 |
| Melt Index $I_2$ estimate (g/10 min) | 0.08 | 0.08 | 0.11 | 0.10 |
| SECOND ETHYLENE POLYMER (Deconvolution Studies) | | | | |
| $M_n$ | 31,086 | 17,187 | 20,103 | 19,301 |
| $M_w$ | 62,172 | 34,373 | 40,207 | 38,601 |
| Weight fraction (%) | 0.80 | 0.67 | 0.69 | 0.67 |
| $M_Z$ | 93,258 | 51,560 | 60,310 | 57,902 |
| Branch Freq/1000C (SCB2) | 0.0 | 0.4 | 0.6 | 0.5 |
| Density estimate (g/cm$^3$) (d2) | 0.9503 | 0.9526 | 0.9502 | 0.9510 |
| Melt Index $I_2$ estimate (g/10 min) | 5.28 | 56.75 | 30.07 | 35.45 |
| Estimated d2 – d1 (g/cm$^3$) | 0.0179 | 0.0274 | 0.0202 | 0.0223 |

TABLE 4

| | Internal Comparison | Comparative Example 2 | Comparative Example 3 | Example 1 | Example 2 | Example 3 |
|---|---|---|---|---|---|---|
| TENSILE PROPERTIES (Plaques) | | | | | | |
| Elong. at Yield (%) | 10 | 10 | | 10 | 10 | 10 |
| Elong. at Yield Dev. (%) | 1 | 1 | | 0 | 0 | 1 |
| Yield Strength (MPa) | 24.2 | 21.8 | | 22.9 | 23.3 | 22.9 |
| Yield Strength Dev. (MPa) | 0.1 | 0.3 | | 0.4 | 0.2 | 0.2 |
| Ultimate Elong. (%) | 1037 | 1050 | | 814 | 950 | 939 |
| Ultimate Elong. Dev. (%) | 43 | 36 | | 94 | 28 | 62 |
| Ultimate Strength (MPa) | 36.7 | 32.9 | | 31.4 | 37.1 | 35.7 |
| Ultimate Strength Dev. (MPa) | 0.7 | 1.2 | | 5.5 | 1.1 | 4.6 |
| Sec Mod 1% (MPa) | 1442 | 1030 | | 1071 | 1010 | 1181 |
| Sec Mod 1% (MPa) Dev. | 418 | 162 | | 75 | 81 | 363 |
| FLEXURAL PROPERTIES (Plaques) | | | | | | |
| Flex Secant Mod. 1% (MPa) | 1025 | 916 | | 957 | 979 | 1006 |
| Flex Sec Mod 1% (MPa) Dev. | 28 | 50 | | 13 | 22 | 8 |
| Flex Tangent Mod. (MPa) | 1277 | 1020 | | 1168 | 1192 | 1272 |
| Flex Tangent Mod. Dev. (MPa) | 94 | 72 | | 53 | 45 | 20 |
| Flexural Strength (MPa) | 31.4 | 30 | | 31 | 30.8 | 30.6 |
| Flexural Strength Dev. (MPa) | 0.4 | 1 | | 0.3 | 0.7 | 0.3 |
| ESCR (Plaques) | | | | | | |
| ESCR ($f_{50}$)Cond. A at 100% (hrs) 100% CO-630 | 73 | 253.6 | 463 | >1000 | >1000 | >1000 |
| ESCR ($f_{50}$)Cond. B at 100% (hrs) 100% CO-630 | 147 | 392.5 | 748 | >1000 | >1000 | >1000 |

TABLE 5

| Description | Oven Residence Time (min) | Low Temperature ARM Impact (−40° C.) | | Color as is | | Density as is (g/cm³) |
|---|---|---|---|---|---|---|
| | | Mean Failure Energy (ft.lb) | Ductility (%) | Whiteness WI E313 | Yellowness Index | |
| Internal Comparison | 18 | 109 | 100 | 86.2 | −9.8 | 0.9371 |
| | 20 | 144 | 100 | 85.9 | −10.4 | 0.9458 |
| | 22 | 189 | 100 | 85.1 | −10.3 | 0.947 |
| | 24 | 0 | 0 | 53.0 | 0.7 | 0.947 |
| Example 1 | 18 | 112 | 56 | 90.8 | −11.1 | 0.9338 |
| | 20 | 195 | 100 | 90.3 | −11.4 | 0.9418 |
| | 22 | 194 | 100 | 89 | −11 | 0.945 |
| | 24 | 0 | 0 | 64.9 | −2.9 | 0.9451 |
| Example 2 | 18 | 108 | 78 | 88.1 | −9.8 | 0.9368 |
| | 20 | 152 | 88 | 86.8 | −9.6 | 0.9449 |
| | 22 | 201 | 100 | 83.7 | −8.6 | 0.9463 |
| | 24 | 163 | 0 | 65.7 | −2.7 | 0.9469 |
| Example 3 | 18 | 117 | 40 | 90.0 | −10.1 | 0.9369 |
| | 20 | 131 | 70 | 89.0 | −10.1 | 0.9439 |
| | 22 | 179 | 100 | 86.0 | −9.3 | 0.9469 |
| | 24 | 197 | 100 | 83.3 | −8.7 | 0.9471 |

While the present invention has been particularly set forth in terms of specific embodiments thereof, it will be understood in view of the instant disclosure that numerous variations upon the invention are now enabled yet reside within the scope of the invention. Accordingly, the invention is to be broadly construed and limited only by the scope and spirit of the claims now appended hereto.

What is claimed is:

1. A bimodal polyethylene copolymer comprising from 0.1 to 5 weight % of one or more $C_{6-8}$ alpha olefins and the balance ethylene, comprising from 20 to 50 weight % of a higher molecular weight polymer component having an Mw greater than 120,000 and correspondingly from 80 to 50 weight % of a lower molecular weight polymer component having an Mw less than 100,000 having a density greater than 0.942 g/cc but less than 0.965 g/cc, an Mz/Mw from 2.4 to 3.2 and a bent strip ESCR ($f_{50}$) as determined by ASTM D 1693 in 100% Igepal CO-630 (ethoxylated nonylphenols) for conditions A and B of greater than 1000 hours.

2. The polyethylene copolymer according to claim 1, wherein the higher molecular weight component has an Mw from 140,000 to 300,000.

3. The polyethylene copolymer according to claim 2, wherein the lower molecular weight component has an Mw from 20,000 to 80,000.

4. The polyethylene copolymer according to claim 3, wherein the higher molecular weight component is present in an amount from 30 to 40 weight % based on the weight of the copolymer.

5. The polyethylene copolymer according to claim 4, wherein the higher molecular weight component has a density from 0.918 to 0.934 g/cc.

6. The polyethylene copolymer according to claim 5, wherein the lower molecular weight component has a density greater than 0.942 to 0.960 g/cc.

7. The polyethylene copolymer according to claim 6, wherein the density difference between the higher molecular weight component and the lower molecular weight component is less than 0.030 g/cc.

8. The polyethylene copolymer according to claim 7, having a density greater than 0.942 g/cc.

9. The polyethylene copolymer according to claim 8, having a flat to reverse comonomer incorporation.

10. The polyethylene copolymer according to claim 9, having a degree of internal unsaturation from 0.1 to 0.5 per 1000 carbon atoms.

11. A rotomolded article, which comprise the resin according to claim 1.

* * * * *